United States Patent [19]

Kitamori

[11] Patent Number: 5,323,365
[45] Date of Patent: Jun. 21, 1994

[54] RECORDING METHOD FOR OPTO-MAGNETIC DISK

[75] Inventor: Tetsuji Kitamori, Sendai, Japan

[73] Assignee: Alps Electric Co., Ltd., Tokyo, Japan

[21] Appl. No.: 887,637

[22] Filed: May 22, 1992

[51] Int. Cl.⁵ .............................................. G11B 11/00
[52] U.S. Cl. ........................................ 369/13; 360/59
[58] Field of Search ................... 369/13, 110, 116; 360/59, 114; 365/122

[56] References Cited

U.S. PATENT DOCUMENTS

| 4,873,680 | 10/1989 | Chung et al. | 369/116 X |
| 5,020,040 | 5/1991 | Lee | 369/13 |
| 5,065,377 | 11/1991 | Spruit et al. | 369/13 |

FOREIGN PATENT DOCUMENTS 352104  1/1990  European Pat. Off. ............. 369/13

Primary Examiner—Tony M. Argenbright
Attorney, Agent, or Firm—Guy W. Shoup; David W. Heid; Patrick T. Bever

[57] ABSTRACT

A recording method for an opto-magnetic disk apparatus by which pit edge recording of an opto-magnetic disk can be achieved and the track recording density is enhanced. The recording method is applied to an opto-magnetic disk apparatus wherein a light emitting element is driven with a pulse signal to form pits on a record face of a disk and a magnetic field is applied to such pit portions to modulate the pits. According to the method, the amount of information to be included in a pit modulated is made equal to or greater than 2 bits, and the period of the pulse signal to drive the light emitting element is changed in response to a bit or bits for a fraction to be recorded.

4 Claims, 10 Drawing Sheets

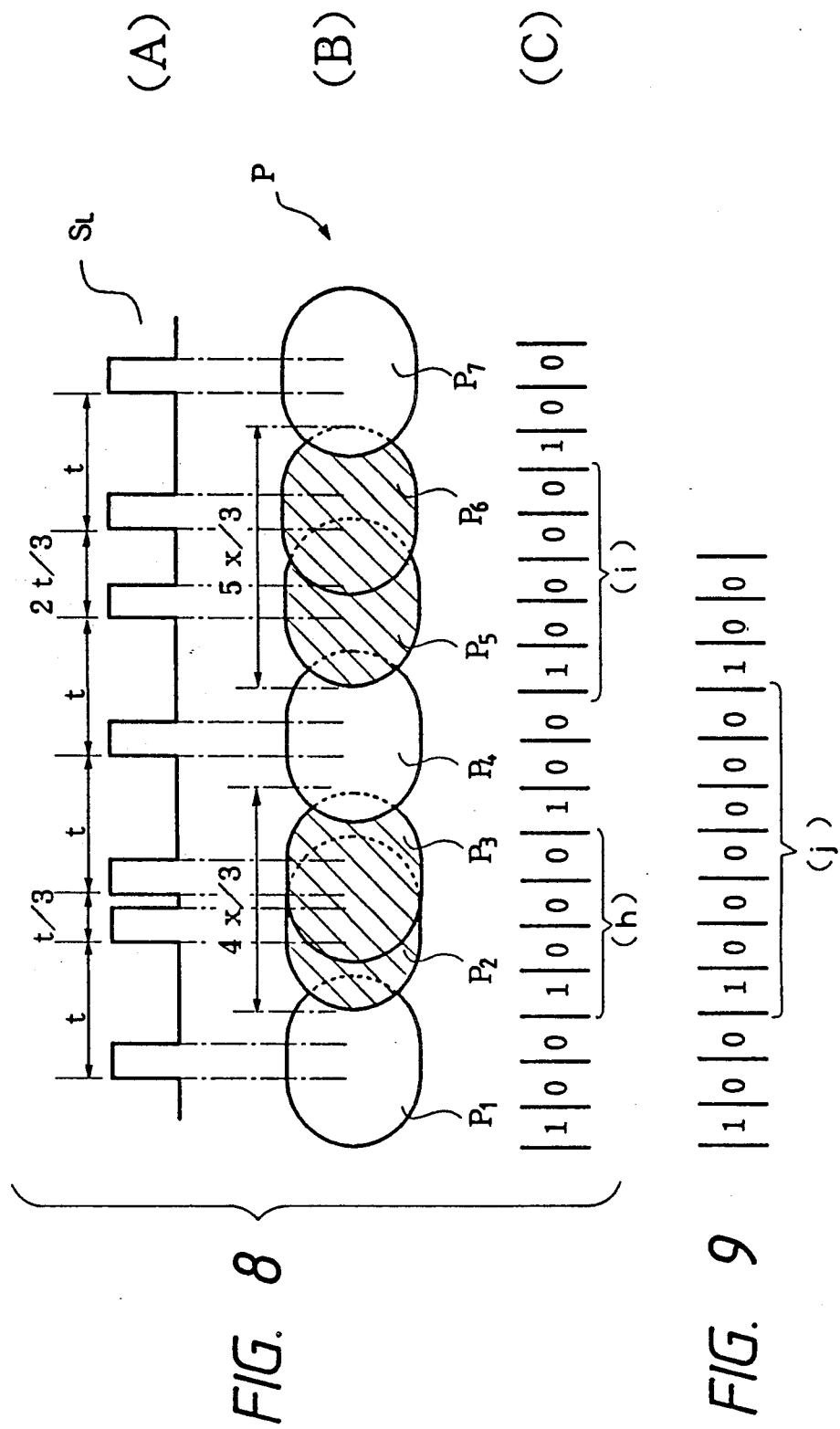

RECORDING METHOD FOR OPTO-MAGNETIC DISK

BACKGROUND OF THE INVENTION

1. Field of the Invention

This invention relates to an opto-magnetic disk apparatus which can be overwritten by magnetic modulation, and more particularly to a recording method by which a track recording density of an opto-magnetic disk apparatus is enhanced.

2. Description of the Prior Art

Opto-magnetic disk apparatus which make use of magnetic modulation are already known. General construction of an exemplary one of conventional opto-magnetic disk apparatus is shown in FIG. 10.

Referring to FIG. 10, the conventional opto-magnetic disk apparatus shown is of the pulse-driven type and includes a semiconductor laser 1 which serves as a light emitting element and is driven by a laser driving pulse signal SL of a predetermined period. Laser light emitted from the semiconductor laser 1 is collimated into parallel rays of light by a collimate lens 2, passes a beam splitter 3 and is focused on a record face Da of a disk D by an objective lens 4. When the laser 1 emits laser light in response to a driving pulse signal SL in this manner so that a laser spot is formed on the record face Da of the disk D, the record face Da is heated to a temperature higher than its Curie point by energy of the laser light so that a pit is formed on the record face Da. A magnetic head 5 is disposed above the disk D and magnetically modulates the pit formed by heat of the laser spot on the record face Da in accordance with a modulation signal SR conforming to record data.

In a reproducing operation, the semiconductor laser 1 is continuously driven so that a spot of laser light scans pits formed on the record face Da of the disk D and the pits are read by a pin photodiode 6. Thus, reproduction of information conforming to a Kerr rotational angle according to modulation of the pits is performed.

FIG. 11 illustrates such recording operation as described above. Referring to FIG. 11, a waveform (A) shows a clock pulse signal $S_C$; waveform (B) shows a laser driving pulse signal $S_L$; waveform (C) shows a modulation signal $S_R$ for the magnetic head; drawing (D) shows pits formed on the record face Da of the disk D; drawing (E) shows a cross-sectional view of a modulated condition of the record face Da; and waveform (F) shows a temperature variation of the record face Da at a pit $P_1$.

According to the conventional recording method for an opto-magnetic disk apparatus as shows in FIG. 10, the semiconductor laser 1 is intermittently driven in the period t by the laser driving pulses $S_L$ in synchronism with the clock pulses $S_C$. If the time for which the laser 1 emits light in response to a laser driving pulse $S_L$ is $t_0$, then the record face Da of the disk D is heated for a period of time substantially equal to the driving time $t_0$, and areas thus heated make pits $P_1$, $P_2$, $P_3$, ... shown in FIG. 11. The thus heated pits $P_1$, $P_2$, $P_3$, ... are magnetically modulated in response to a modulation signal $S_R$ for the magnetic head shown by the curve (C) of FIG. 11. In the drawing (D) of FIG. 11, the pits $P_1$ and $P_4$ modulated in accordance with the value "1" of the modulation signal $S_R$ applied to the magnetic head 5 are indicated by hatching lines while the other pits $P_2$, $P_3$ and $P_5$ modulated in accordance with the value "0" of the modulation signal $S_R$ are indicated without hatching lines.

Magnetic modulation of a pit proceeds such that, as seen from the waveform (F) of FIG. 11 a pit is heated by a laser spot so that the temperature of the record face of the disk rises beyond the Curie point and then a direction of a magnetic field by the magnetic head 5 is recorded when the temperature drops across the Curie point. A demodulation condition when a semiconductor laser in the present day is used and driven by a pulse exhibits such a steep variation as seen from the drawing (E) of FIG. 11.

The recording method of the pulse-driven type shown in FIG. 11 is superior in that magnetic domains of pits can be made short to achieve a considerably high track recording density comparing with other recording methods.

The above described conventional recording method, however, is disadvantageous in that, since each pit records information of only one bit as seen from FIG. 11, further enhancement of the track recording density is severely limited. In particular, in order to further enhance the track recording density with the recording method of FIG. 11, the length of a pit should further be reduced. However, since a pit heated by a laser spot presents such a thermal response as seen from the curve (F) of FIG. 11, if it is taken into consideration that the time $t_4$ until magnetic modulation of a pit after heating thereof is several tens nanoseconds and also a variation of the laser power and cooling rates on the inside and the outside of a disk are taken into consideration, in order to achieve a high S/N ratio, the pulse period must be set to a value higher than the time $t_4$. Accordingly, there is a limitation in enhancement of the track recording density.

Further, it seems an idea to effect pit edge recording making use of such a steep rising edge of a modulation condition as seen from the curve (F) of FIG. 11. Such pit edge recording is performed by 2-7 modulation based on RLL (Run Length Limited) coding. In particular, a code of "100", "1000" or the like is recorded for each rising edge of modulation. In this instance, however, the length of a pit in the time base direction must necessarily be controlled in accordance with a length of a code. However, with a conventional method wherein the frequency and the phase of laser pulses are fixed, it is very difficult, for the reason that the influence of a thermal characteristic of a record medium is high and also for some other reasons, to freely control the bit length.

SUMMARY OF THE INVENTION

It is an object of the present invention to provide a recording method for an opto-magnetic disk apparatus by which pit edge recording of an opto-magnetic disk can be achieved and the track recording density is enhanced.

In order to attain the object, according to the present invention, there is provided a recording method for an opto-magnetic disk apparatus wherein a light emitting element is driven with a pulse signal to form pits on a record face of a disk and a magnetic field is applied to such pit portions to modulate the pits, wherein the amount of information to be included in a pit modulated is equal to or greater than 2 bits, and the period of the pulse signal to drive the light emitting element is changed in response to a bit or bits for a fraction to be recorded.

Preferably, when the amount of information of a pit is n bits, n being an integer equal to or greater than 2, the period of the pulse signal driving the light emitting element is advanced or delayed by $2\pi/n$ multiplied by a suitable interger.

Preferably, at least one of the amplitude and the pulse width of the pulse signal for driving the light emitting element is varied.

In the recording method, a pit is used for information of two or more bits, and demodulation of a PLL code is performed by pit edge recording. In this instance, the amount of information included in a pit is limited and a fraction may sometimes appear in bits to be included in a pit. In case where a fraction appears, the period of a pulse signal for driving the light emitting element is displaced in an advancing or delaying direction, and a bit or bits for the fraction are included in the pit formed by the pulse signal.

For example, in case the amount of information of n bits is provided to a pit, when a fraction which exceeds n appears in the bits to be recorded, the period of the driving pulse signal for the light emitting element is advanced or delayed by $2\pi/n$ multiplied by an integer. Due to such displacement of the period, a pit for including the bit or bits of the fraction therein can be formed.

Further, when the period of the driving pulse signal for the light emitting element is to be further decreased, a record area of a pit can be formed stably by suitably varying at least one of the amplitude and the pulse width of the pulse signal.

Thus, with the recording method of the present invention, pit edge recording wherein the frequency and/or the phase of the laser driving pulse signal are varied is made possible, and consequently, the track recording density on a record face of an opto-magnetic disk can be enhanced. Further, since the period of the laser driving pulse signal is varied as a method of controlling the pit length, its possible effect on a thermal characteristic of a record medium can be reduced comparing with another method wherein the laser driving time itself is controlled.

Further, since, when the period of time of the driving pulse signal is to be further decreased, at least one of the amplitude and the pulse width of the pulse signal is varied suitably, recording with a further high track recording density can be achieved.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 10:
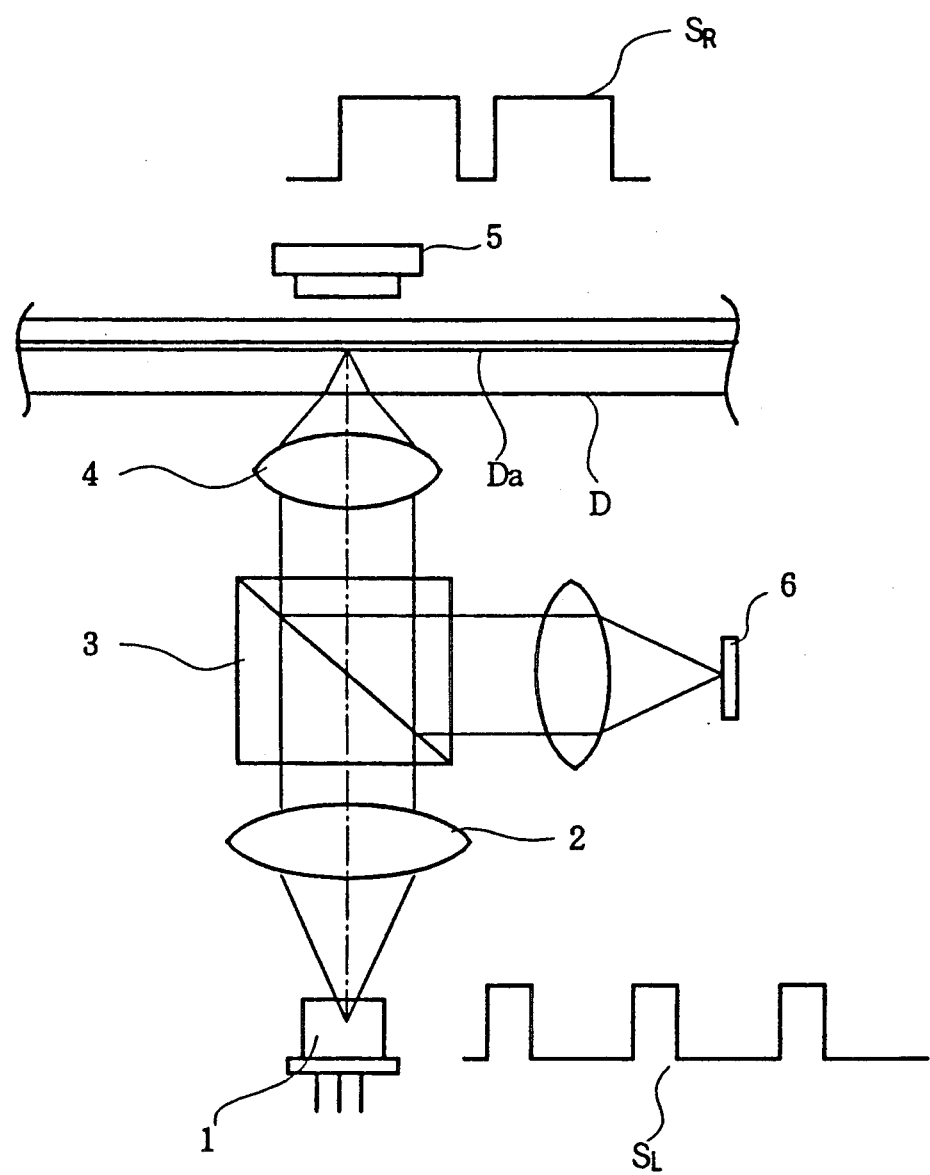
FIG. 10 is a diagrammatic view showing general construction of an opto-magnetic disk apparatus.

Referring first to FIGS. 1 to 6, there is shown a recording method according to a first preferred embodiment of the present invention. In the recording method, the amount of information of one bit is equal to 2. The present recording method may be worked with an opto-magnetic disk apparatus which has such construction as described hereinabove with reference to FIG. 10. Further, in the present recording method, pit edge recording by 1–7 modulation based on RLL coding is performed.

Figure 1:
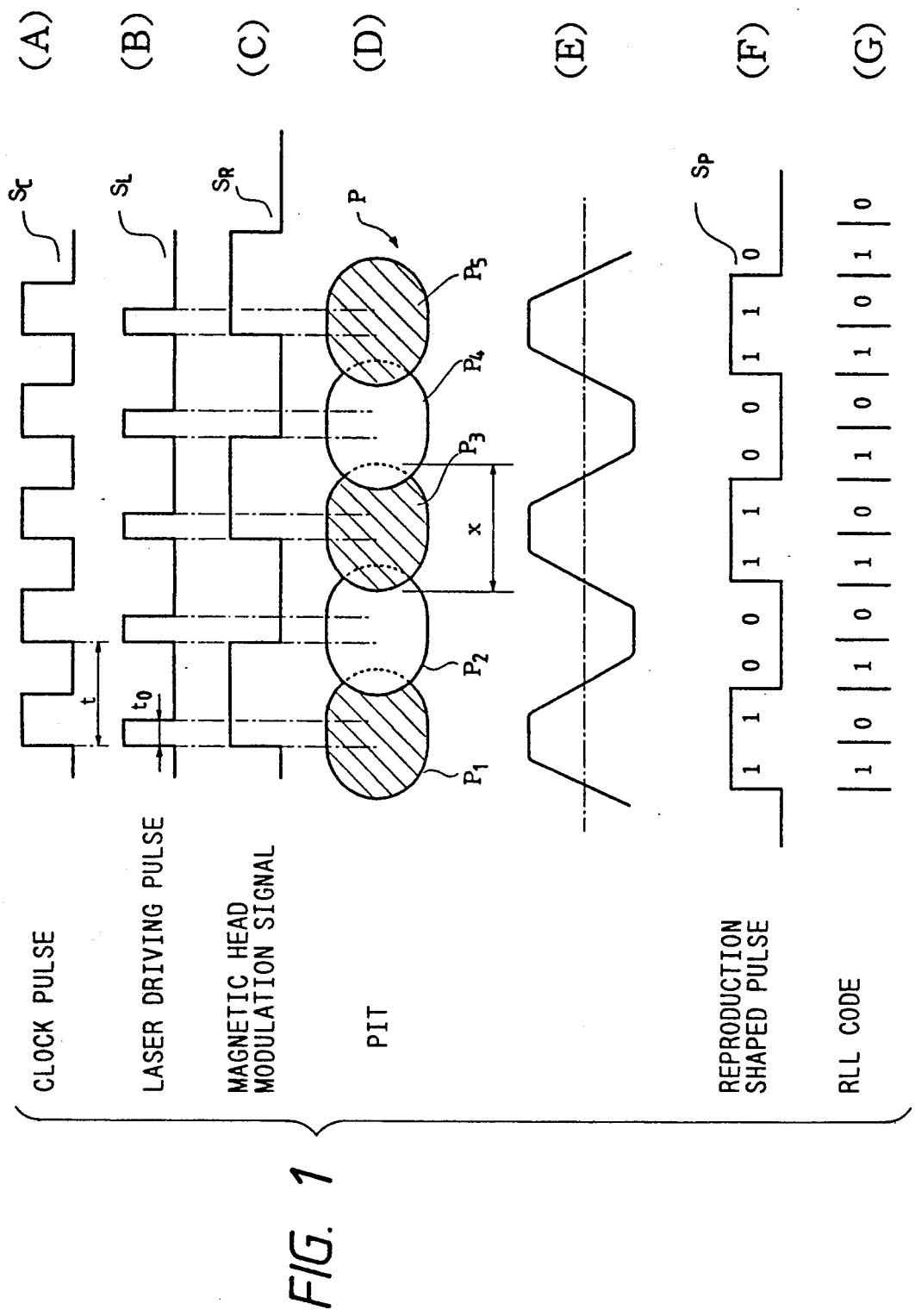
FIGS. 1(A–G) to 6(A–G) are waveform diagrams illustrating a recording method showing a first preferred embodiment of the present invention.

Referring first to FIG. 1, there is illustrated modulation of a code of "101010", that is, modulation of a code which includes "0" between "1" and "1". A waveform (A) shows a clock pulse signal $S_C$; waveform (B) shows a laser driving pulse signal $S_L$; waveform (C) shows a modulation signal $S_R$ for a magnetic head; drawing (D) shows pits P formed on the record face Da of the disk D; and drawing (E) shows a modulated condition of the record face Da. Further, a curve waveform (F) shows a pulse signal $S_P$ obtained by waveform shaping of a reproduction signal, and drawing (G) shows 1–7 modulated RLL codes demodulated from the reproduction pulse signal $S_P$. The relationship among the drawings (A) to (G) is similar to those in FIGS. 2 to 6.

In FIG. 1, each of pits $P_1$, $P_2$, ... has information of 2 bits. In the condition of FIG. 1, the laser driving pulse signal $S_L$ has a fixed period t. Therefore, pits $P_1$, $P_2$, ... of a length equal to a driving time $t_0$ of a driving pulse $S_L$ are formed regularly in accordance with the period t of the driving pulse signal $S_L$. Meanwhile, the modulation signal $S_R$ presents a repeat of "1" and "0" for a rising edge of each laser driving pulse $S_L$. The pits $P_1$, $P_3$ and $P_5$ modulated in accordance with "1" of the modulation signal $S_R$ are indicated by hatching lines while the pits $P_2$ and $P_4$ modulated in accordance with "0" of the modulation signal $S_R$ are indicated without hatching lines. Consequently, the record face Da of the disk D exhibits such a modulation condition as seen from the drawing (E) in FIG. 1.

The waveform (F) of FIG. 1 shows a pulse signal $S_P$ obtained by waveform shaping of a reproduction signal while the waveform (G) of FIG. 1 shows a 1–7 modulated RLL code from the pulse signal $S_P$. In this manner, each pit has information of 2 bits.

Figure 2:
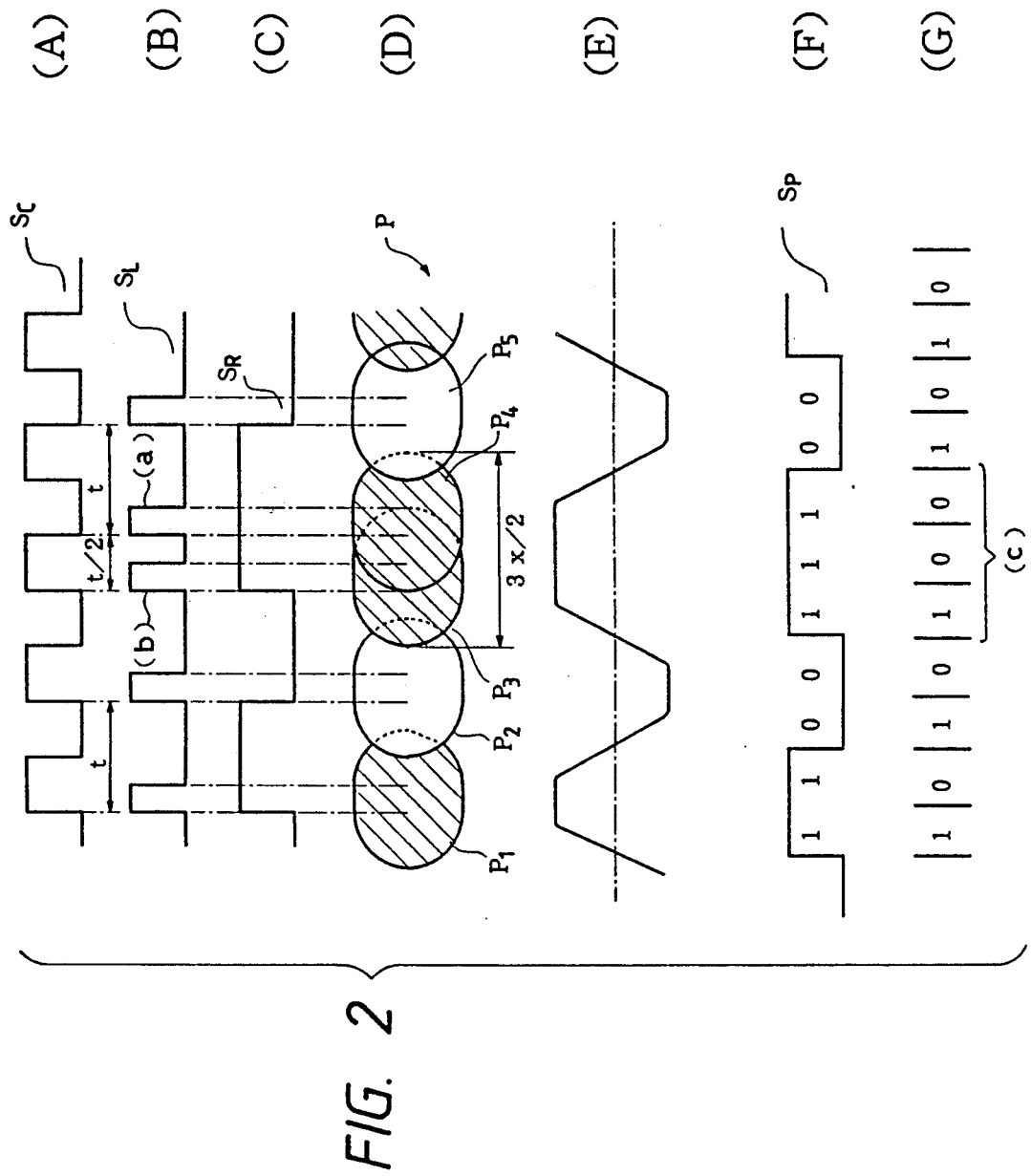

FIG. 2 illustrates modulation of an RLL code when it includes two "0"s between "1" and "1" like "10010". Since the bit number included in one pit is n=2 in the present embodiment, in FIG. 2, the period t of the laser driving pulse signal $S_L$ is advanced, only in the case of the code of "100", by $2\pi/n$, that is, by t/2. In the waveform (B) of FIG. 2, a laser driving pulse which is advanced in period is indicated by (a) while another pulse immediately precedent to the pulse is indicated by (b). Meanwhile, the modulation signal $S_R$ for the magnetic head shown by the waveform (C) of FIG. 2 exhibits a modulation signal of "1" when the semiconductor laser 1 is driven by the driving pulses indicated by (a) and (b).

Thus, the pits $P_3$ and $P_4$ are overlapped with each other as seen from the drawing (D) of FIG. 2 by the driving pulses (a) and (b), and thus, the substantial length of the pit indicated by hatching lines is equal to $3\times/2$ while that of FIG. 1 is equal to x. The waveform (F) of FIG. 2 shows a reproduction pulse signal $S_P$ of the pits, and as seen from the waveform (F), information of 3 bits is provided to the pit indicated by the hatching lines in this manner. Thus, as seen from the drawing (G) of FIG. 2, a demodulated RLL code includes "100" in a section indicated at (c). In particular, one bit which is a fraction exceeding 2 bits of the pit $P_3$ in the drawing (D) of FIG. 2 is obtained at the overwritten bit $P_4$. It is to be noted that, as seen from the waveform (B) of FIG. 2, the period of a pulse next to the driving pulse (a) for which the period has been advanced is returned to t, and consequently, as seen from the drawing (G) of FIG. 2, the code "100" is followed by "10".

Figure 3:
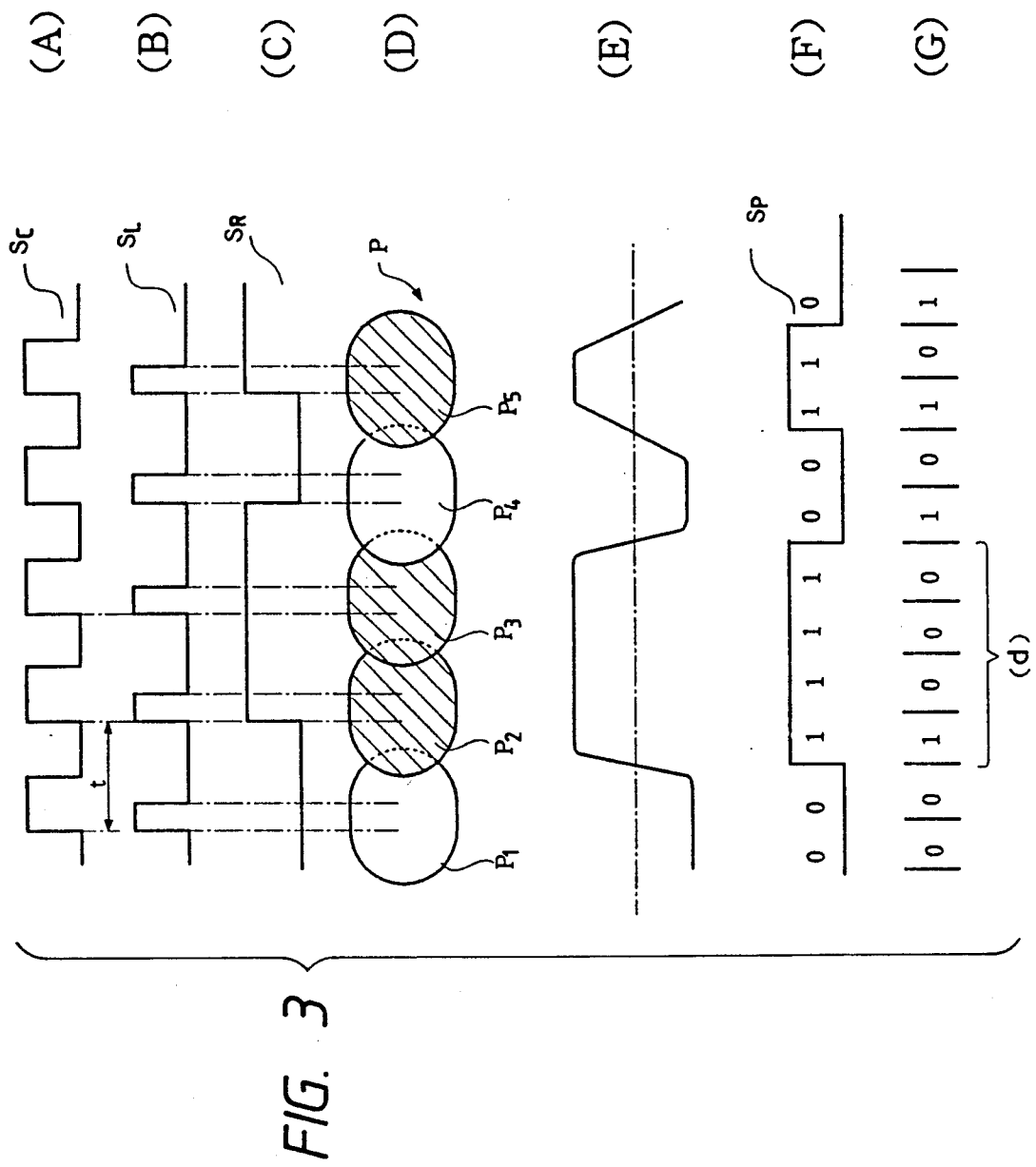

FIG. 3 illustrates modulation when an RLL code includes three "0"s between "1" and "1" such as "100010". In this instance, the period of the laser driving pulse signal $S_L$ shown by the waveform (B) of FIG. 3 is equal to t and fixed similarly as in the case of FIG. 1. And, modulation of "1" is applied to two adjacent pits $P_2$ and $P_3$ in accordance with the modulation signal $S_R$ for the magnetic head. Consequently, the two pits $P_2$ and $P_3$ present such modulation condition of "1" as indicated by hatching lines. If the modulated pits are reproduced and demodulated into an RLL code as shown by the drawing (G) of FIG. 3, "1000" is obtained in a section indicated at (d).

Figure 4:
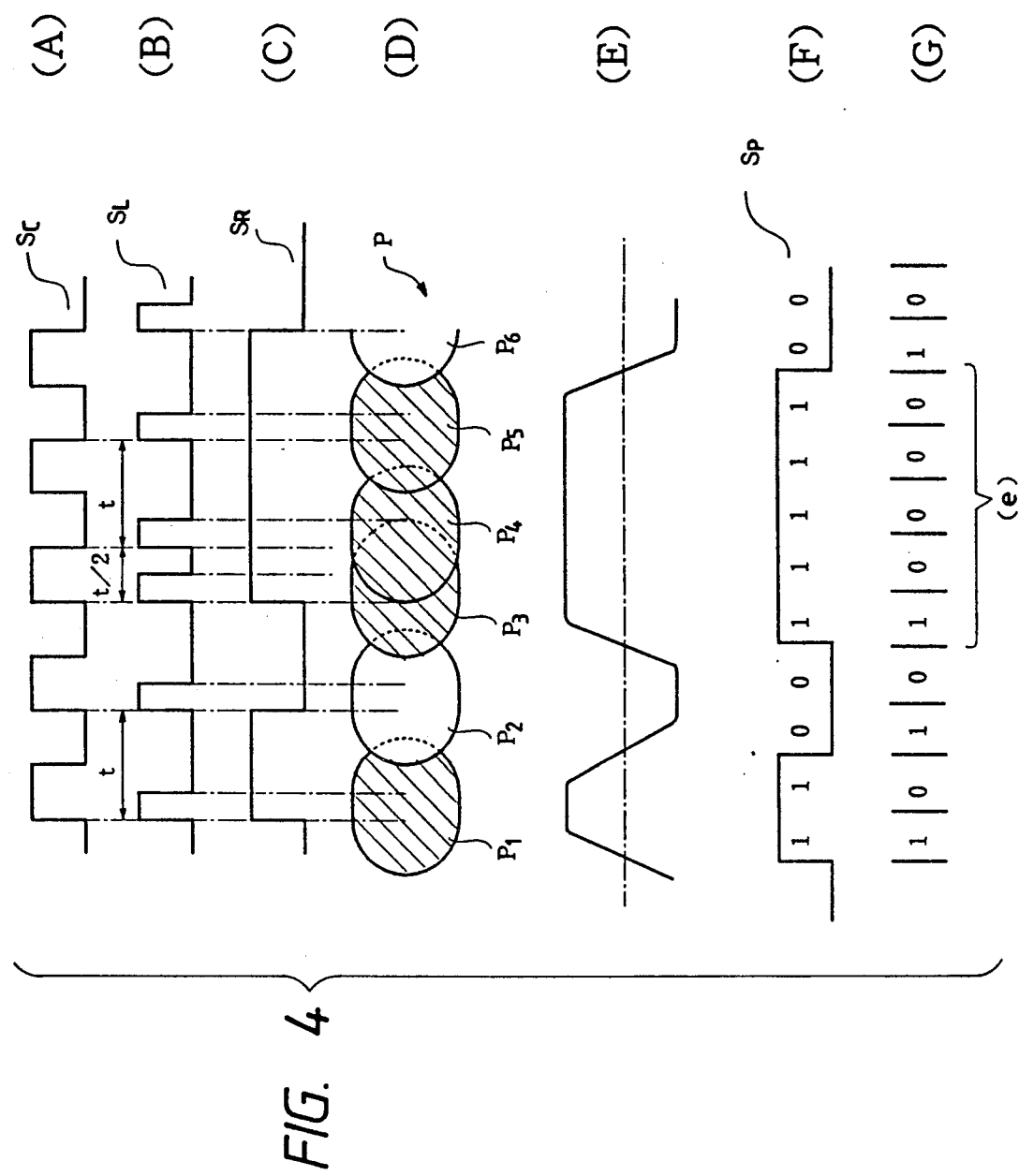

FIG. 4 illustrates modulation when an RLL code includes four "0"s between "1" and "1" such as "1000010". In this instance, similarly as in the case of FIG. 2, a pulse indicated at (a) of the laser driving pulse signal $S_L$ is advanced by a t/2 period so that the pit $P_4$ is overwritten with the pit $P_3$. Then, in accordance with the modulation signal $S_R$ for the magnetic head, the pits $P_3$, $P_4$ and $P_5$ are modulated into "1". As a result, the pits $P_3$, $P_4$ and $P_5$ present a same modulation condition as indicated by hatching lines. It is to be noted that the period of a pulse subsequent to the laser driving pulse (a) is returned to t. Consequently, "11111" is obtained in the reproduction pulse signal $S_P$ shown by the drawing (F), and "10000" s obtained in a section indicated at (e) by demodulation into an RLL code shown by the drawing (G).

Figure 5:
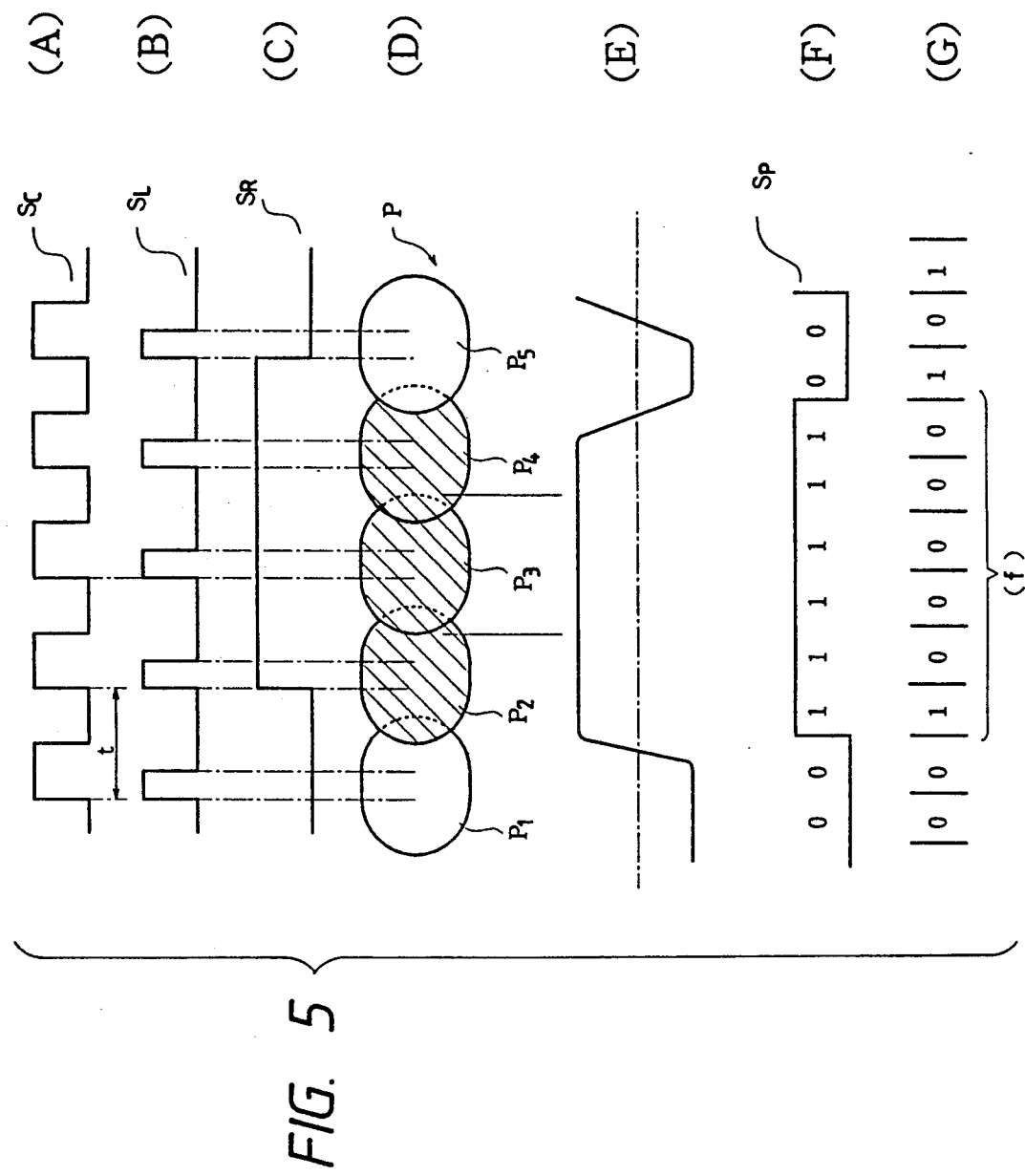

Further, FIG. 5 illustrates modulation when an RLL code includes five "0"s between "1" and "1" such as "10000010". In this instance, the period of the laser driving pulse signal $S_L$ shown by the waveform (B) is equal to t and fixed similarly as in the cases of FIGS. 1 and 3. And, modulation into "1" is applied to adjacent three pits $P_2$, $P_3$ and $P_4$ in accordance with the modulation signal $S_R$ for the magnetic head. Consequently, the three pits $P_2$, $P_3$ and $P_4$ present a modulation condition of "1" as indicated by hatching lines. If the modulation pits are reproduced and demodulated into an RLL code as shown by the drawing (G) of FIG. 5, "100000" is obtained in a section indicated at (f).

Figure 6:
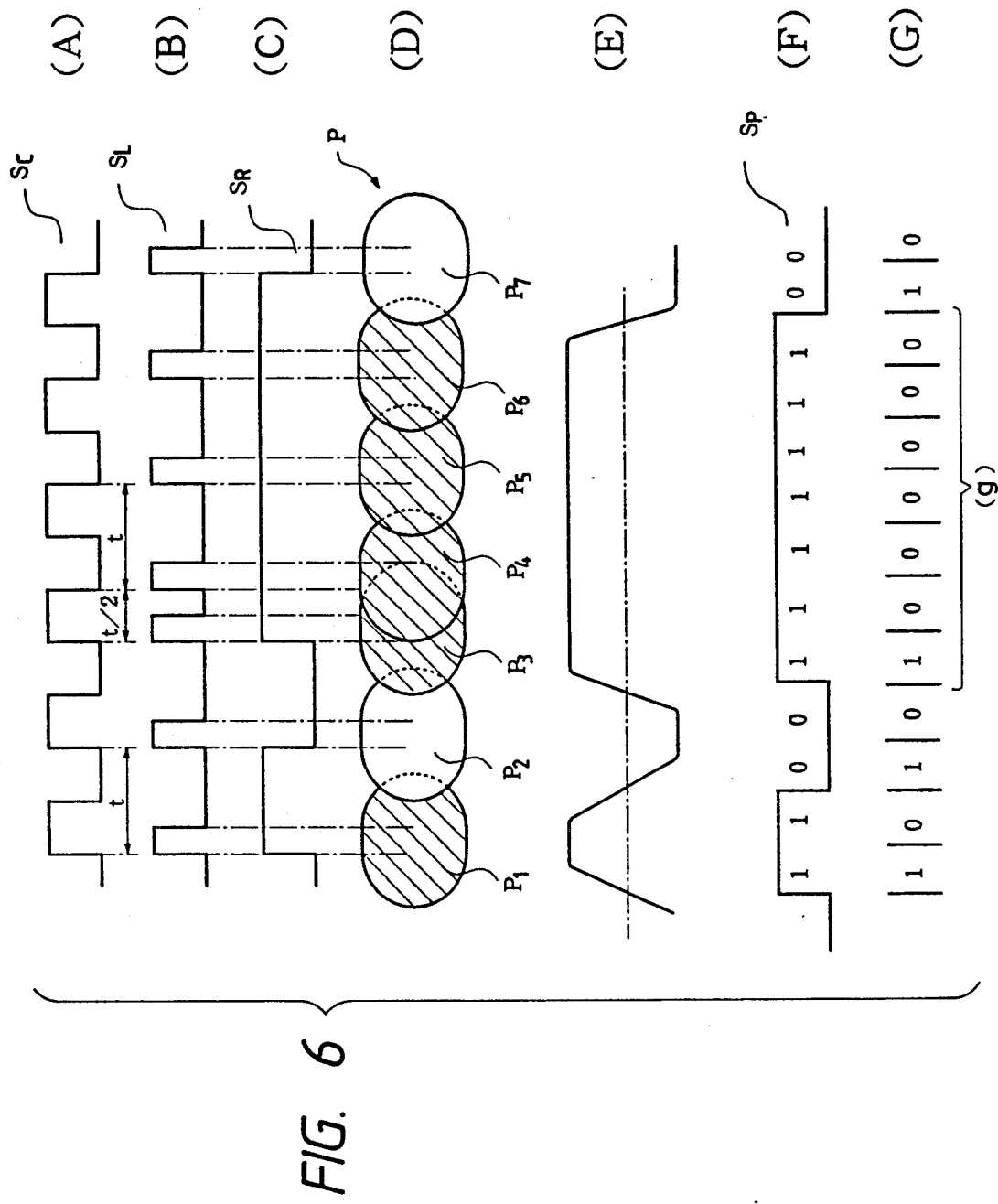

FIG. 6 illustrates modulation when an RLL code includes six "0"s between "1" and "1" such as "100000010". In this instance, similarly as in the cases of FIGS. 2 and 4, a pulse indicated at (a) of the laser driving pulse signal $S_L$ is advanced by a t/2 period so that the pit $P_4$ is overwritten with the pit $P_3$. Then, in accordance with the modulation signal $S_R$ for the magnetic head, the pits $P_3$, $P_4$, $P_5$ and $P_6$ are modulated into "1". As a result, the pits $P_3$, $P_4$, $P_5$ and $P_6$ present a same modulation condition as indicated by hatching lines. It is to be noted that the period of a pulse subsequent to the laser driving pulse (a) is returned to t. Consequently, "1111111" is obtained in the reproduction pulse signal $S_P$ shown by the drawing (F), and "1000000" is obtained in a section indicated at (g) by demodulation into an RLL code shown by the drawing (G).

As seen from FIGS. 1 to 6, when an RLL code of 1–7 modulation is to be recorded while the amount of information of a pit is n=2 bits, in case the number of "0" between "1" and "1" is an even number, the period of the laser driving pulse signal $S_L$ is advanced by t/2, but in case the number of "0" is an odd number, the period of the laser driving pulse signal $S_L$ is fixed.

Figure 7:
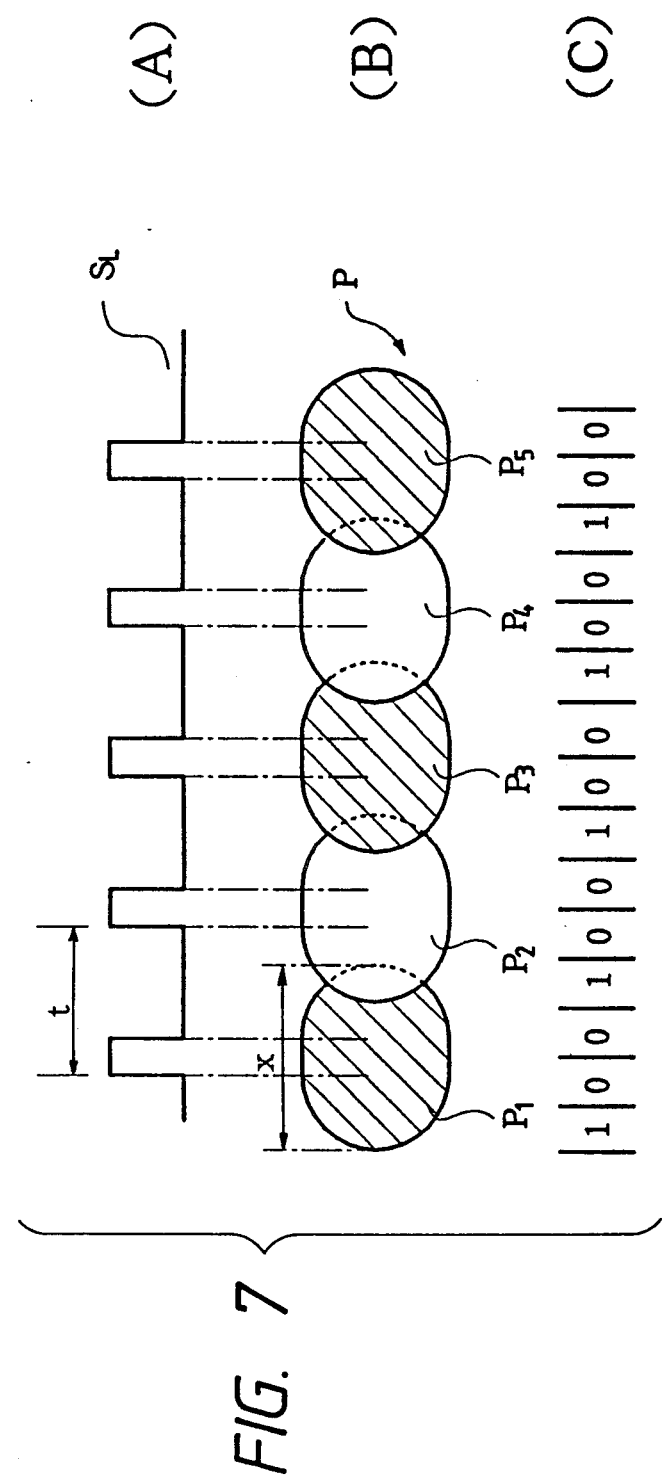
FIGS. 7(A–C), 8(A–C) and 9 are waveform diagrams illustrating another recording method showing a second preferred embodiment of the present invention.

FIGS. 7 to 9 show a second preferred embodiment of the present invention. The present embodiment is a recording method by 2–7 modulation of an RLL code with the amount of information of a pit set to n=3.

Referring first to FIGS. 7 and 8, a waveform (A) shows a laser driving pulse signal $S_L$; drawing (B) shows pits on the record face Da of the disk D; and drawing (C) shows a demodulated RLL code.

FIG. 7 illustrates modulation of an RLL code when it includes two "0"s between each adjacent "1" and "1" such as "100100100". In this instance, the period of the laser driving pulse signal $S_L$ is equal to t and fixed, and in accordance with a modulation signal for the magnetic head, pits $P_1$, $P_3$ and $P_5$ are modulated into "1" while pits $P_2$ and $P_5$ are modulated into "0". Each of the pits $P_I$, $P_2$, . . . includes information of three bits, and a demodulated RLL code includes repetitions of "100".

Subsequently, in a section indicated at (h) of FIG. 8, demodulation of an RLL code which includes three "0"s between "1" and "1" such as "100010" is performed. Since, in the present embodiment, the number of bits included in a pit is n=3, in this instance, the period t of the laser driving pulse signal $S_L$ is advanced by $4\pi/n$, that is, by 2t/3. Consequently, the pit $P_2$ is overwritten with the pit $P_3$, and the substantial pit length is, when the length of a pit shown in FIG. 7 is equal to x, equal to 4×/3. Then, in accordance with modulation signal for the magnetic head, the pits $P_2$ and $P_3$ are modulated into "1" as seen from hatching lines. If the pits are reproduced and demodulated into an RLL code, then "1000" is obtained as indicated at (h) in the drawing (C) of FIG. 8.

Demodulation of a code which includes four "0"s between "1" and "1" is illustrated in a section indicated at (i) of FIG. 8. In this instance, the period of the laser driving pulse signal $S_L$ is advanced by t/3. Consequently, the length of the overwritten pits $P_5$ and $P_6$ is equal to 5×/3. In accordance with the modulation signal for the magnetic head, the pits $P_5$ and $P_6$ are modulated into "1" so that they exhibit such a condition as indicated by hatching lines. If the pits $P_5$ and $P_6$ are reproduced and demodulated into an RLL code, then "10000" is obtained as indicated at (i) of the drawing (C) of FIG. 8. It is to be noted that, while the period of the laser driving pulse signal $S_L$ is advanced by 2t/3 in the region indicated at (h) in FIG. 8 but the period of the laser driving pulse signal $S_L$ is advanced by t/3 in the region indicated at (i), the period of the laser driving pulse signal $S_L$ in recording the other pits is returned to t.

FIG. 9 illustrates modulation of a code "1000000", that is, a code which includes six "0"s between "1" and "1" in the modulating method of n=3 described above. In this instance, similarly to the modulation of the code indicated at (h) of FIG. 8, the period of the laser driving pulse signal $S_L$ is advanced by 2t/3 so that the pit $P_3$ is overlapped with the pit $P_2$. Meanwhile, the period of the pits $P_3$ and $P_4$ and the period of the pits $P_4$ and $P_5$ remain equal to t. Then, in accordance with the modulation signal for the magnetic head, the pits $P_2$, $P_3$ and $P_4$ are modulated into "1" and the pits $P_1$ and $P_5$ are modulated into "0" such that the pits P₂, P₃ and P₄ may exhibit such a condition as indicated by hatching lines. Consequently, "1000000" is obtained as indicated at (j) of FIG. 9.

In case a code of "1000000", that is, a code which includes five "0"s between "1" and "1", is to be modulated, the period of the laser driving pulse signal $S_L$ is left equal to t similarly as in the case of FIG. 7. Then, in accordance with the modulation signal for the magnetic head, for example, two successive pits P₂ and P₃ are modulated into "1" and two pits P₁ and P₄ on the opposite sides of them are modulated into "0". A code of "100000" is obtained by demodulation of a reproduction signal from the pits.

While, in the embodiments described above, demodulations in the cases of n=2 and n=3 when the amount of information of a pit is n bits are described above, the information amount may otherwise be equal to or more than n=4. Further, while, in the embodiments illustrated in FIGS. 1 to 9, the period of the laser driving pulse signal $S_L$ is advanced to assure a bit for a fraction, when the overlapping area of pits is sufficiently wide, a pit length for a bit or bits for a fraction may otherwise be assured by delaying the period of the laser driving pulse signal.

As described so far, while, in the embodiments described above, pulses of the pulse signal driving the light emitting element have a fixed amplitude and a fixed pulse width, when it is necessary to decrease the period of the pulse signal or the like in order to further enhance the track recording density, deterioration of the like of a disk can be prevented and deterioration of the S/N ratio can be prevented by varying at least one of the amplitude and the pulse width of the pulse signal.

Figure 11:
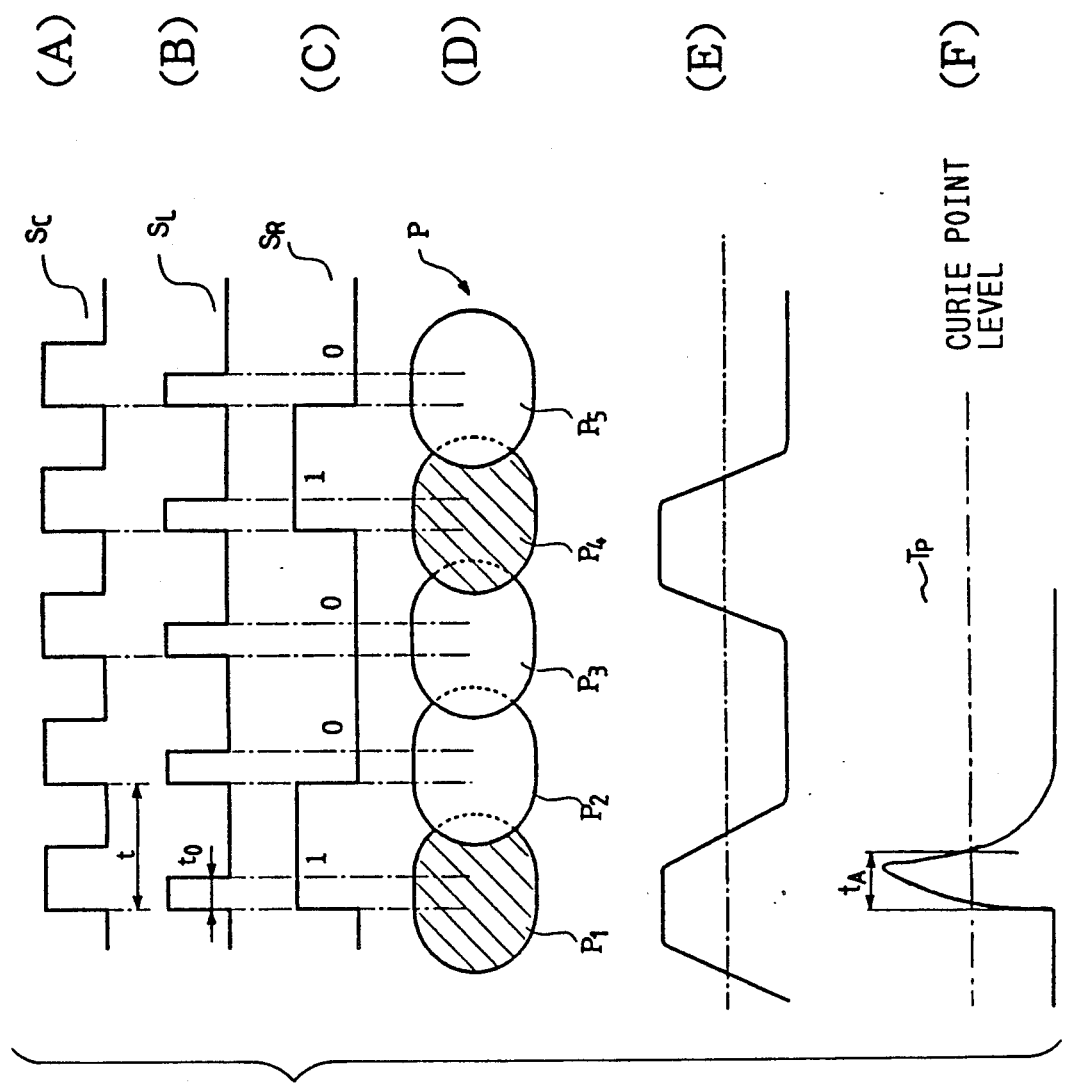
FIG. 11(A–F) are a waveform diagram illustrating a conventional recording method.

In particular, if at least one of the amplitude and the pulse width of the pulse signal is varied suitably, then the time $t_4$ of the waveform (F) of Fig. 11 need not be increased and the heating temperature of a laser spot does not become excessively high.

Having now fully described the invention, it will be apparent to one of ordinary skill in the art that many changes and modifications can be made thereto without departing from the spirit and scope of the invention as set forth herein.

What is claimed is:

1. A recording method for an opto-magnetic disk apparatus comprising the steps of:

driving a light emitting element with a pulse signal having a period, pulse width and amplitude, to form pits on a record face of a disk; and applying a magnetic field to portions of the pit to modulate the pits, wherein the amount of information to be included in a modulated pit is equal to or greater than 2 bits, and the period of the pulse signal driving said light emitting element is changed in response to a bit or bits for a fraction to be recorded.

2. A recording method for an opto-magnetic disk apparatus according to claim 1, wherein, when the amount of information of a pit is n bits, n being an integer equal to or greater than 2, the period of the pulse signal to drive said light emitting element is advanced or delayed by $2\pi/n$ multiplied by a suitable integer.

3. A recording method for an opto-magnetic disk apparatus according to claim 1, wherein at least one of the amplitude and the pulse width of the pulse signal for driving said light emitting element is varied.

4. A recording method for an opto-magnetic disk apparatus according to claim 2, wherein at least one of the amplitude and the pulse width of the pulse signal for driving said light emitting element is varied.

* * * * *